United States Patent
Compton

(10) Patent No.: US 8,306,362 B2
(45) Date of Patent: Nov. 6, 2012

(54) SELECTIVE PIXEL BINNING AND AVERAGING BASED ON SCENE ILLUMINANT

(75) Inventor: John T. Compton, LeRoy, NY (US)

(73) Assignee: OmniVision Technologies, Inc., Santa Clara, CA (US)

( * ) Notice: Subject to any disclaimer, the term of this patent is extended or adjusted under 35 U.S.C. 154(b) by 909 days.

(21) Appl. No.: 11/185,393

(22) Filed: Jul. 20, 2005

(65) Prior Publication Data

US 2007/0030366 A1    Feb. 8, 2007

(51) Int. Cl.
*G06K 9/32* (2006.01)
*H04N 3/14* (2006.01)

(52) U.S. Cl. .................. 382/299; 382/298; 348/294

(58) Field of Classification Search ............. 250/208.1; 348/294; 382/298, 299
See application file for complete search history.

(56) References Cited

U.S. PATENT DOCUMENTS

| | | | |
|---|---|---|---|
| 4,591,900 A | 5/1986 | Heeb et al. | |
| 5,990,950 A | 11/1999 | Addison | |
| 6,057,586 A | 5/2000 | Bawolek et al. | |
| 6,400,404 B2* | 6/2002 | Hirota et al. | 348/314 |
| 6,614,483 B1 | 9/2003 | Lee et al. | |
| 6,654,492 B1* | 11/2003 | Sasai | 382/162 |
| 6,970,608 B1* | 11/2005 | Michael | 382/299 |
| 7,034,876 B2* | 4/2006 | Harada | 348/319 |
| 7,256,831 B2* | 8/2007 | Iizuka | 348/315 |
| 7,848,575 B2* | 12/2010 | Watanabe et al. | 382/192 |
| 2002/0105586 A1 | 8/2002 | Harada | |
| 2003/0086005 A1* | 5/2003 | Nakamura | 348/223.1 |
| 2003/0169355 A1* | 9/2003 | Kubo | 348/272 |
| 2004/0017493 A1* | 1/2004 | Daiku et al. | 348/272 |
| 2004/0125223 A1 | 7/2004 | Iizuka | |
| 2005/0068455 A1* | 3/2005 | Hatano | 348/345 |
| 2006/0109352 A1* | 5/2006 | Draijer | 348/230.1 |

FOREIGN PATENT DOCUMENTS

| | | |
|---|---|---|
| JP | 11331706 | 11/1999 |
| JP | 2000032345 | 1/2000 |

OTHER PUBLICATIONS

International Search Report and Written Opinion for Application No. PCT/US06/27776 dated Feb. 1, 2007, 8 pages.
International Preliminary Report on Patentability for Application No. PCT/US06/27776 dated Jan. 22, 2008, 6 pages.
Office Action for Application No. 2008-522882 dated Mar. 13, 2012, 6 pages.
Office Action for Application No. 2008-522882 dated May 18, 2011, 7 pages.
Office Action for Application No. 06787654.0 dated Jan. 14, 2009, 3 pages.

(Continued)

*Primary Examiner* — Anand Bhatnagar
*Assistant Examiner* — Soo Park
(74) *Attorney, Agent, or Firm* — Blakely, Sokoloff, Taylor & Zafman

(57) ABSTRACT

A method for reading out pixel values for a two dimensional array, the method includes the steps of periodically combining at least two pixel values of a same first color in a first dimension of the two dimensional array; reading out the combined pixel values of the first color; and reading out pixels of a second color in the first dimension of the two dimensional array.

23 Claims, 4 Drawing Sheets

OTHER PUBLICATIONS

Office Action for Application No. 200680026084.X dated Jan. 31, 2012, 6 pages.
Office Action for Application No. 200680026084.X dated Mar. 17, 2010, 11 pages.
Office Action for Application No. 200680026084.X dated Jun. 5, 2009, 4 pages.
Office Action for Application No. 200680026084.X dated Nov. 17, 2010, 17 pages.
Office Action for Application No. 95122752 dated Jun. 27, 2012, 4 pages.
Office Action for Application No. 2008-7001467 dated Aug. 21, 2012, 6 pages.

* cited by examiner

SELECTIVE PIXEL BINNING AND AVERAGING BASED ON SCENE ILLUMINANT

FIELD OF THE INVENTION

The invention relates generally to the field of subsampling of pixels of an image sensor. More specifically, the invention relates to subsampling pixels of an image sensor that changes pixel sensitivity to account for scene illuminant changes.

BACKGROUND OF THE INVENTION

Subsampling image sensors for reducing spatial resolution is performed for purposes such as increasing processing speed and the like. Referring to FIG. 1, there is shown a Bayer color filter array (CFA) used for creating color images on the image sensor. To reduce resolution, prior art image sensors are subsampled by skipping pixels (designated by the X) as shown in FIG. 2. Alternatively, the prior art reduces resolution by combining pixels as shown in FIG. 3. In this regard, the individual colors are combined both vertically and horizontally as shown by the curved lines. The resulting subsampled image for both FIG. 2 and FIG. 3 have sampling characteristics that are not optimal for representing the subsampled image. Specifically, the pixels that comprise the subsampled image are not evenly spaced but are instead grouped together. This results in a perceived lower resolution image than might be anticipated by the amount of subsampling done.

Consequently there exists a need for better subsampling of an image. Also, since subsampling is often needed to reduce spatial resolution and increase speed for the purpose of generating a sequence of images for video, there is also a need to improve the sensitivity of one color relative to another color to account for changes in scene illuminant, for example, if the scene is illuminated with tungsten light. Therefore, a further need exists to accomplish subsampling in a manner that also changes the sensitivity of specific colors to match the scene illuminant.

SUMMARY OF THE INVENTION

The present invention is directed to overcoming one or more of the problems set forth above. Briefly summarized, according to one aspect of the present invention, the present invention is directed to a method for reading out pixel values for a two dimensional array, the method comprising the steps of periodically combining at least two pixel values of a same first color in a first dimension of the two dimensional array; reading out the combined pixel values of the first color; and reading out pixels of a second color in the first dimension of the two dimensional array.

These and other aspects, objects, features and advantages of the present invention will be more clearly understood and appreciated from a review of the following detailed description of the preferred embodiments and appended claims, and by reference to the accompanying drawings.

ADVANTAGEOUS EFFECT OF THE INVENTION

The present invention has the following advantage of permitting selective combining and subsampling of colors based on lighting conditions in order to improve the inherent white balance, or chromatic sensitivity, of the image sensor, while also improving the spatial sampling pattern of the resulting reduced resolution image. It also includes the advantage of permitting extended dynamic range in the reduced resolution image when certain combining and subsampling approaches are used.

BRIEF DESCRIPTION OF THE DRAWINGS

Figures 1, 2, 3:
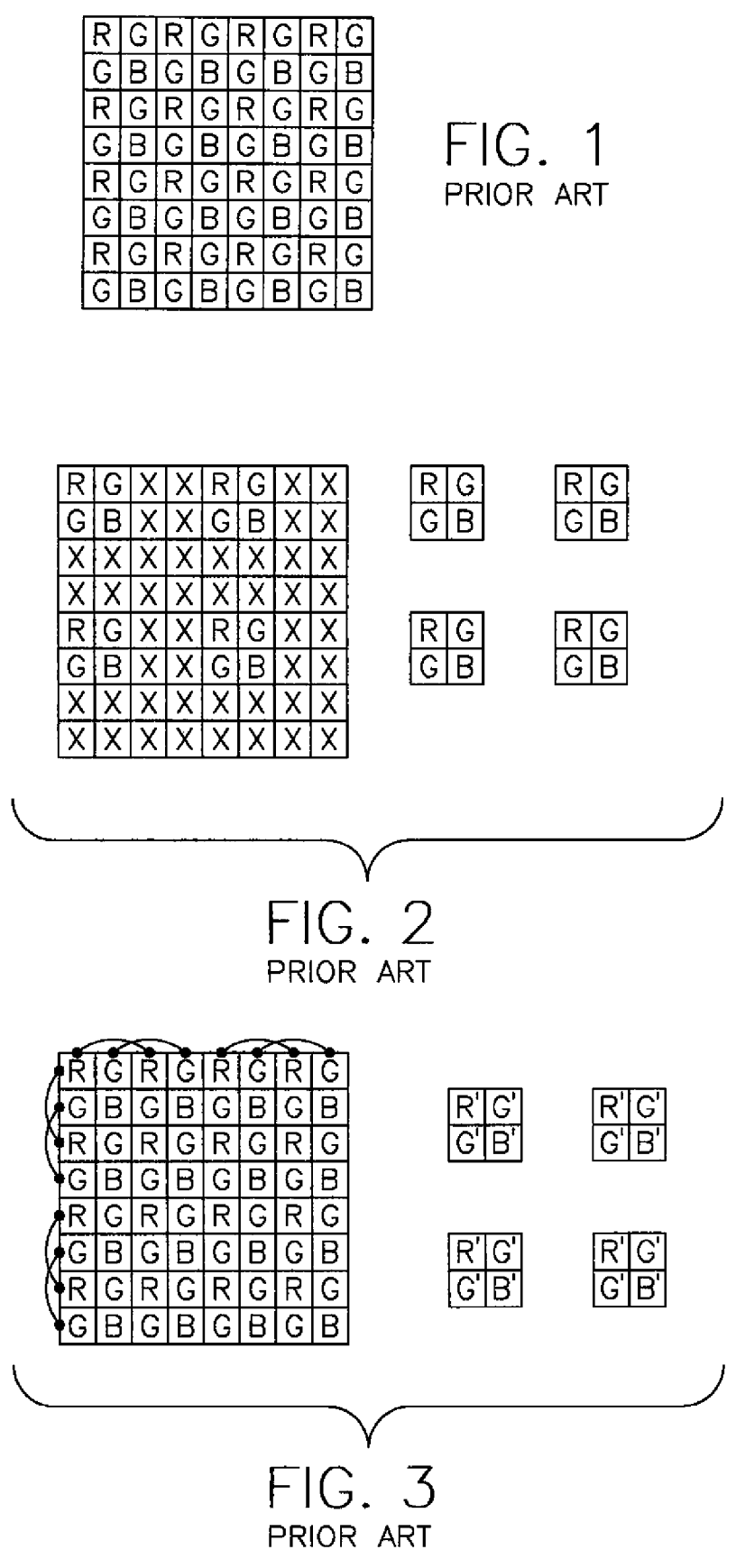

FIG. 1 is a Bayer color filter array pattern;

FIG. 2 is a prior art decimation arrangement for a Bayer color filter array pattern that skips pixels;

FIG. 3 is a prior art decimation arrangement that combines pixels;

FIGS. 4a and 4b are decimation arrangements that skip some pixels and combine some pixels in the vertical direction to favor certain colors;

FIGS. 5a and 5b are decimation arrangements that skip some pixels and combine some pixels in the horizontal direction to favor certain colors;

FIGS. 6a and 6b are decimation arrangements that skip some pixels and combine some pixels in both vertical and horizontal directions to favor certain colors;

FIGS. 7a and 7b are alternative decimation arrangements that skip some pixels and combine some pixels in the vertical direction to favor alternative colors from FIGS. 4a and 4b;

FIGS. 8a and 8b are alternative decimation arrangements that skip some pixels and combine some pixels in the horizontal direction to favor alternative colors from FIGS. 5a and 5b;

FIGS. 9a and 9b are alternative decimation arrangements that skip some pixels and combine some pixels in both vertical and horizontal directions to favor alternative colors from FIGS. 6a and 6b; and FIGS. 10a and 10b are decimation arrangements that skip some pixels and combine some pixels in both the vertical and horizontal directions provide both combined and non-combined green results.

DETAILED DESCRIPTION OF THE INVENTION

The invention will be described in the context of a commonly known Bayer color filter array pattern. It is to be understood that the present invention is applicable to both types of image sensors, CCDs (charge-coupled devices) and active pixel (also commonly known as CMOS) image sensors. It is also noted that a two-dimensional array can be retrieved from any image whether on a sensor or in electronic memory. Specifically, the invention will first describe subsampling in the y direction that also improves the sensitivity of the subsampled blue pixels (FIGS. 4a and 4b), then will describe subsampling in the x direction with similar improvement in blue sensitivity (FIGS. 5a and 5b), and then will describe subsampling in both y and x directions with still further improvement in blue sensitivity (FIGS. 6a and 6b).

Figures 4A, 4B, 5A, 5B, 6A, 6B:
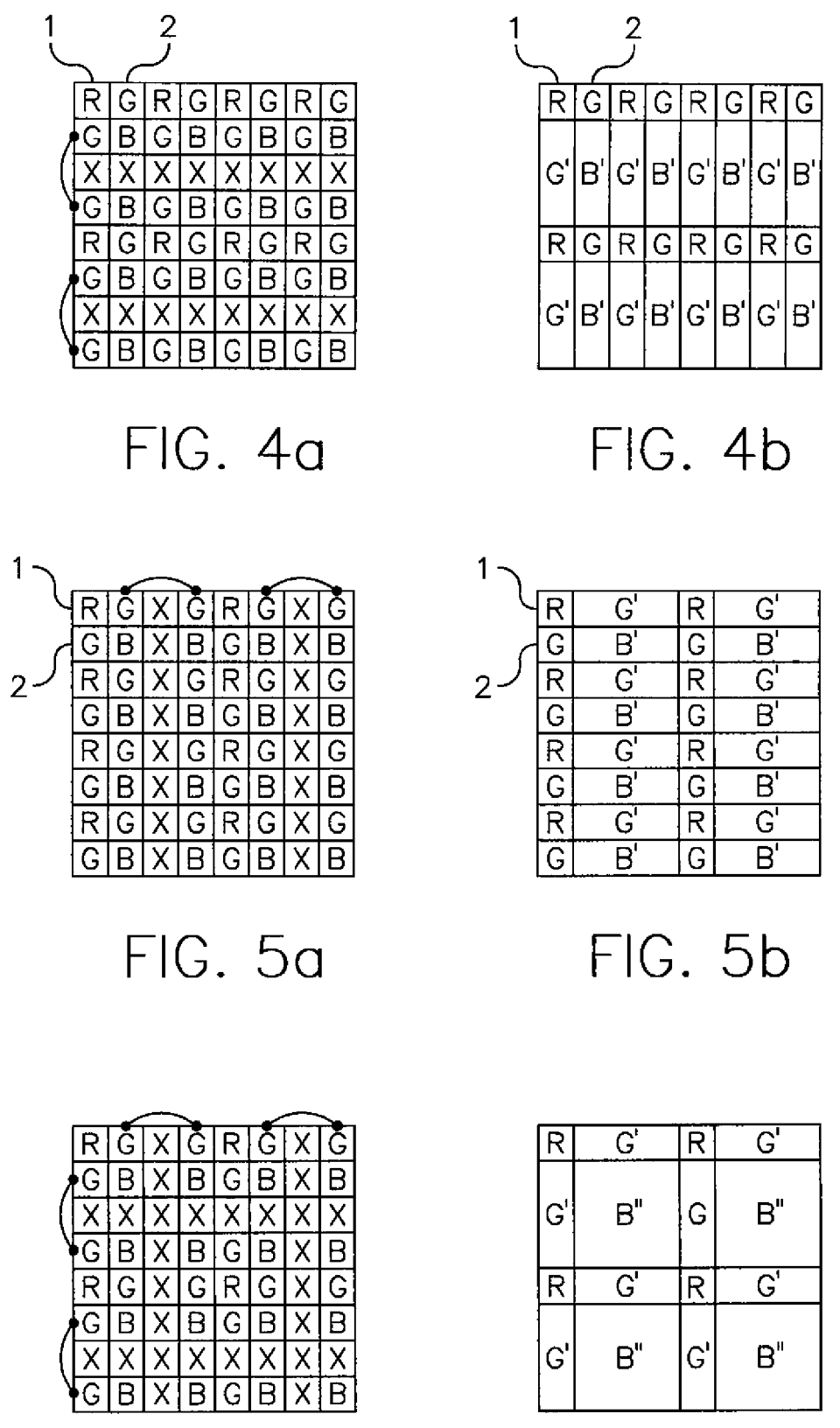

Referring to FIG. 4a, there is shown a top view of a two dimensional image sensor of the present invention. The sensor is covered and spanned by a color filter array, typically a Bayer color filter, for creating pixels containing different colors. The present invention is directed to subsampling the image sensor to create a smaller resolution image that exhibits a different color balance than that of a non-subsampled image or prior art subsampled images. For example, the non-subsampled image may be better suited for capturing images in daylight and the subsampled image may be better suited for capturing images in incandescent light. To achieve this, the image sensor of the present invention periodically combines at least two pixel values of a same first color, the color blue in column 2, in the y direction of the two dimensional array. It is further noted that green is combined in column 1. The combined pixel values of the first color are read out of the sensor, via a horizontal shift register in a CCD image sensor and by addressable column circuits in a CMOS image sensor. The non-combined pixels are also read out in the y direction of the two dimensional array. The non-combined colors are red in column 1 and green in column 2.

The second color is periodically skipped or not read out. The second color is red in column 1 and green in column 2. This is accomplished by not addressing these pixels in a CMOS image sensor and by a fast dump gate in a CCD image sensor. The periodicity is formed by skipping the color between the combined colors. The skipped colors are indicated by Xs in FIG. 4*a*.

Referring to FIG. 4*b*, subsampling by the above described method produces an image having combined first colors and second colors that are uniform in spacing.

Referring to FIGS. 5*a* and 5*b*, it is seen that the image may alternatively be subsampled in the x direction by repeating the above described process with column 1 being analogous to row 1 and column 2 analogous to row 2. Furthermore, it is noted that the subsampling in the x and y directions may be done separately or combined as in FIGS. 6*a* and 6*b* for producing the desired subsampled image. FIGS. 6*a* and 6*b* have the further advantage of additional improvement in blue sensitivity, because additional blue pixels from the original image are combined.

Figures 7A, 7B, 8A, 8B, 9A, 9B:
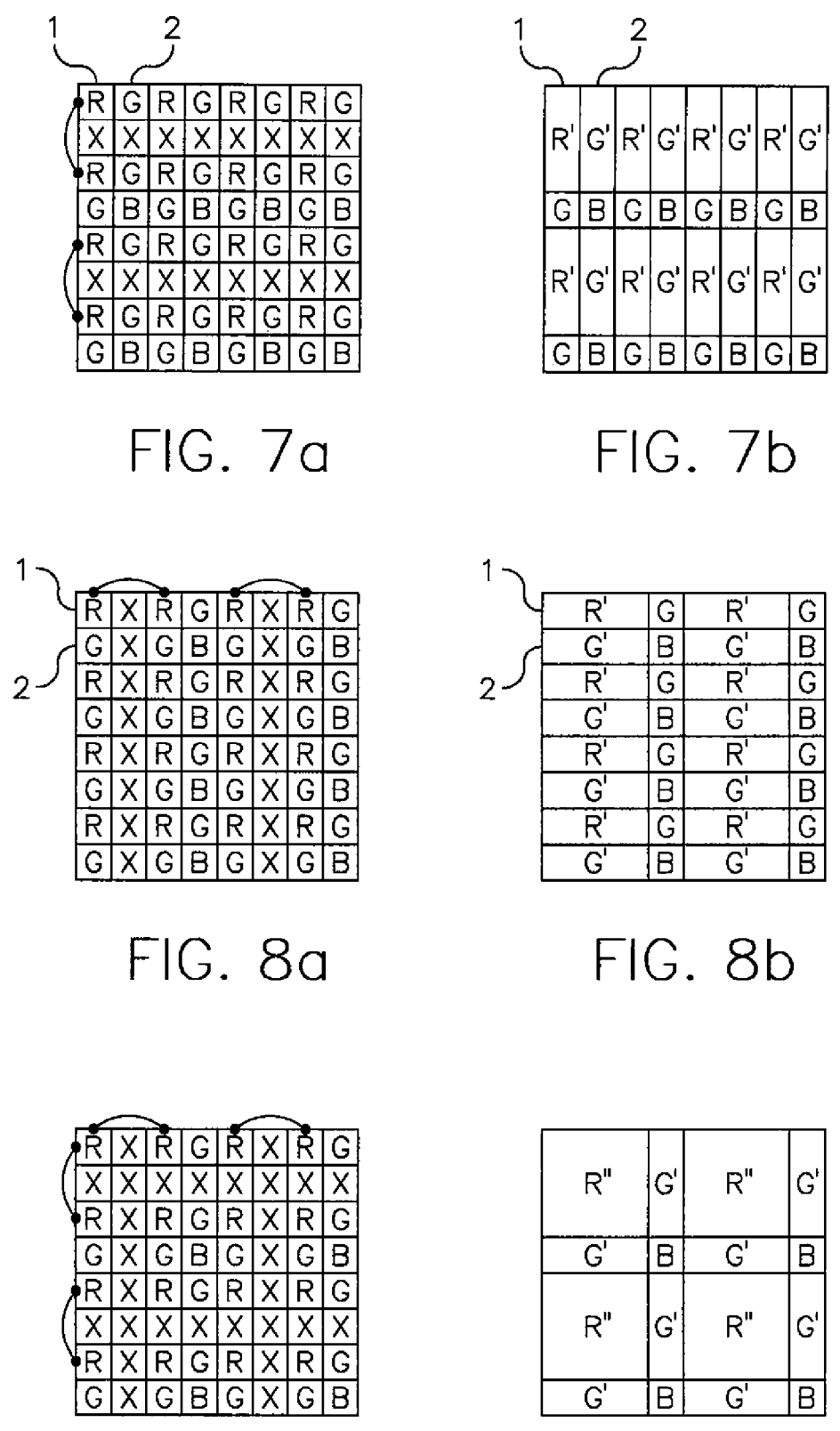

The invention has been described in a manner that improves the sensitivity to blue light. Referring to FIGS. 7*a* and 7*b*, there is shown an alternative embodiment analogous to FIGS. 4*a* and 4*b* but with improved sensitivity to red light instead of blue light. In this regard, the image sensor of the present invention periodically combines at least two pixel values of a same first color, the red in column 1, in the y direction of the two dimensional array. It is further noted that green is combined in column 2. The combined pixel values of the first color are read out of to the sensor. The non-combined pixels are also read out in the y direction of the two dimensional array. The non-combined colors are blue in column 2 and green in column 1.

The second color is periodically skipped or not read out. The second color is blue in column 2 and green in column 1. The periodicity is formed by skipping the color between the combined colors. The skipped colors are indicated by Xs in FIG. 7*a*.

Similar to the correspondence between FIGS. 4*a* and 4*b* and 7*a* and 7*b*, there are corresponding subsampling arrangements but with improved sensitivity to red light: FIGS. 8*a* and 8*b* corresponding to FIGS. 5*a* and 5*b*, and FIGS. 9*a* and 9*b* corresponding to FIGS. 6*a* and 6*b*. Improved sensitivity to blue light may be suited to capturing images illuminated by incandescent light, whereas improved sensitivity to red light may be suited to capturing images illuminated by fluorescent light. Choosing one subsampling scheme over another may be performed automatically by sensor circuitry or by algorithmic examination of the sensor scene data. The selectivity may be performed manually by simply permitting the user to override the automatic function and select the appropriate light based on the sensed lighting conditions.

Figures 10A, 10B:
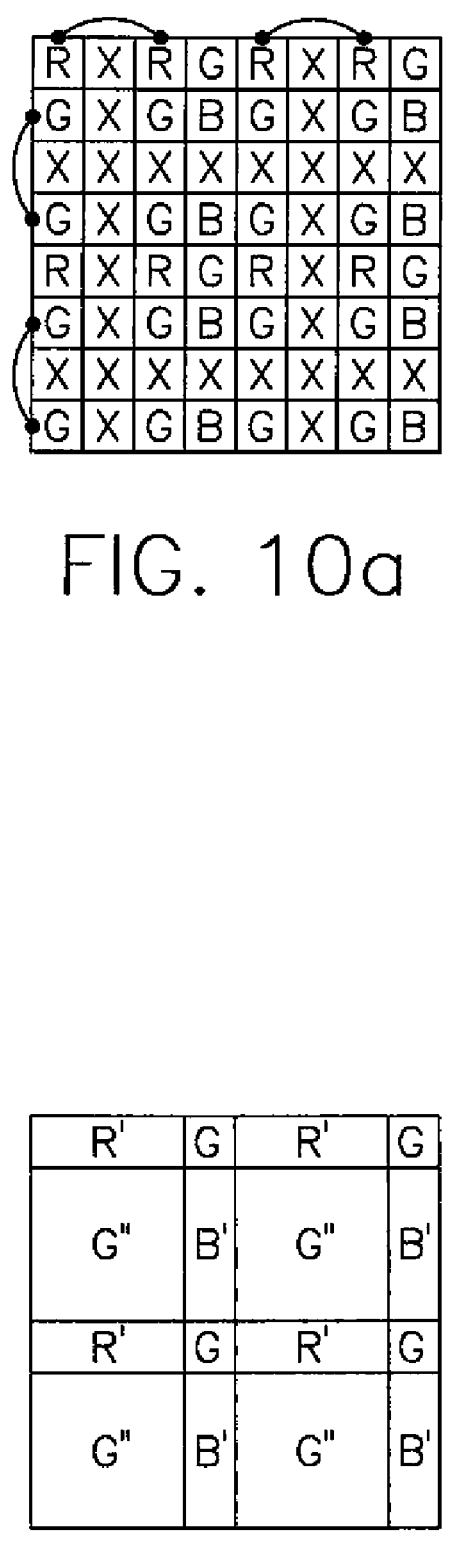

Referring to FIGS. 4*b*, 5*b*, 7*b*, and 8*b*, it is seen that in addition to the combined blue or red color there are also both a non-combined green result and a combined green result. These two green results effectively provide two different green sensitivities in the resulting image. The two green sensitivities can be used to extend the dynamic range of the captured image, with the non-combined green pixels being effective at capturing and reproducing bright areas of the image, the combined green pixels being effective at capturing and reproducing dark areas of the image, and areas of the image that are between the light and dark areas may be effectively represented by both the non-combined and the combined green pixels. Furthermore, referring to FIGS. 10*a* and 10*b*, selectively combining and not combining green pixels in both the horizontal and vertical directions (analogous to combining blue pixels and not combining red pixels in FIGS. 6*a* and 6*b* or to combining red pixels and not combining blue pixels in FIGS. 9*a* and 9*b*) provides a further increase in dynamic range based on the green pixels while not affecting the speed of the red and blue combined pixels relative to each other.

The invention has been described with reference to a preferred embodiment. However, it will be appreciated that variations and modifications can be effected by a person of ordinary skill in the art without departing from the scope of the invention.

The invention claimed is:

1. A method for reading out pixel values for an image from a two dimensional array, the method comprising:
    selecting a first plurality of lines of pixels in a first direction of the two dimensional array, the first plurality of lines of pixels having a height equal to the image or a width equal to the image;
    in each line of the first plurality of lines in the first direction, periodically combining together exactly two consecutive pixel values of a same first color while not combining any pixel values of a second color with any other pixel value, wherein the first plurality of lines of pixels include more than one pixel value of the second color;
    reading out the combined pixel values of the first color;
    reading out at least a portion of the non-combined pixel values of the second color; and
    producing a subsampled image from both the read out combined pixel values of the first color and the read out non-combined pixel values of the second color.

2. The method as in claim 1 wherein not combining any pixel values of the second color with any other pixel value comprises periodically skipping at least one pixel value of the second color.

3. The method as in claim 2 wherein producing the subsampled image comprises producing a subsampled array having combined first color pixel values and non-combined second color pixel values that are uniform in spacing.

4. The method as in claim 1 wherein the combining is selective based on scene illuminant.

5. The method as in claim 1 further comprising:
    selecting a second plurality of lines of pixels in a second direction of the two dimensional array;
    in each line of the second plurality of lines in the second direction, periodically combining together exactly two consecutive pixel values of the same first color while not combining any pixel values of the second color with any other pixel value.

6. The method as in claim 5 wherein not combining any pixel values of the second color with any other pixel value comprises periodically skipping at least one pixel value of the second color.

7. The method as in claim 5 wherein producing the subsampled image comprises producing a subsampled array having combined first color pixel values and non-combined second color pixel values that are uniform in spacing.

8. The method as in claim 5 wherein the combining is selective based on scene illuminant.

9. The method as in claim 5, wherein performing the operations of selecting, periodically combining, and reading out produces an extended dynamic range.

10. The method as in claim 9 wherein the combining is selective based on scene illuminant.

11. The method as in claim 9 wherein the combining is selective based on scene dynamic range.

12. The method as in claim 5:
wherein the two dimensional array comprises rows of pixel values and columns of pixel values;
wherein the first plurality of lines of pixel values in the first direction of two dimensional array comprises one or more of the rows of pixel values; and
wherein the second plurality of lines of pixel values in the second direction of the two dimensional array comprises one or more of the columns of pixel values.

13. The method as in claim 5:
wherein the two dimensional array comprises rows of pixel values and columns of pixel values;
wherein the first plurality of lines of pixel values in the first direction of the two dimensional array comprises one or more of the columns of pixel values; and
wherein the second plurality of lines of pixel values in the second direction of the two dimensional array comprises one or more of the rows of pixel values.

14. The method as in claim 1, wherein performing the operations of selecting, periodically combining, and reading out produce an extended dynamic range.

15. The method as in claim 14 wherein the combining is selective based on scene illuminant.

16. The method as in claim 1 further comprising periodically combining together in selected lines of pixel values in a second direction at least two pixel values of a same third color.

17. The method as in claim 16 further comprising providing a Bayer color pattern for producing the first, second and third colors.

18. The method as in claim 17 further comprising reading out the combined pixel values of the third color.

19. The method as in claim 1 further comprising providing a Bayer color pattern for producing the first and second colors.

20. The method as in claim 1 further comprising combining together in selected lines of pixel values in a second direction at least two pixel values of the second color.

21. The method as in claim 20 further comprising:
reading out the combined pixel values of the second color.

22. A method for reading out pixel values for an image from a two dimensional array, the method comprising:
selecting every line of pixels in a first direction of the two dimensional array, the lines of pixels having a height equal to the image or a width equal to the image;
periodically combining together, in every line of pixels in the first direction, exactly two consecutive pixel values of a same first color while not combining any pixel values of a second color with any other pixel value, wherein the lines of pixels include more than one pixel value of the second color;
reading out the combined pixel values of the first color;
reading out at least a portion of the non-combined pixel values of the second color; and
producing a subsampled image from both the read-out combined pixel values of the first color and the read-out non-combined pixel values of the second color.

23. A method for reading out pixel values for an image from a two dimensional array, the method comprising:
selecting a first plurality of lines of pixels in a first direction of the two dimensional array, the first plurality of lines of pixels having a height equal to the image or a width equal to the image;
in each line of the first plurality of lines in the first direction, periodically combining together exactly two consecutive pixel values of a same first color and combining together exactly two consecutive pixel values of a same second color while not combining any pixel values of a third color with any other pixel value, wherein the first plurality of lines of pixels include more than one pixel value of the second color;
selecting a second plurality of lines of pixels in a second direction of the two dimensional array;
in each line of the second plurality of lines in the second direction, periodically combining together exactly two consecutive pixel values of the same first color and combining together exactly two consecutive pixel values of the same third color while not combining any pixel values of the second color with any other pixel value; and
producing a subsampled image by reading out the combined pixel values and at least a portion of the non-combined pixel values, wherein both the read out non-combined pixel values and the read out combined pixel values are used to produce the subsampled image.

* * * * *